US012282201B2

(12) United States Patent
Poe et al.

(10) Patent No.: US 12,282,201 B2
(45) Date of Patent: Apr. 22, 2025

(54) SPLICING TRAY UTILIZED IN FIBER OPTIC PATCH PANEL ASSEMBLY FOR FIBER OPTIC CABLE CONNECTION MANAGEMENT

(71) Applicant: Google LLC, Mountain View, CA (US)

(72) Inventors: Charles Poe, Palo Alto, CA (US); Clinton S. Morris, Nashville, TN (US); Robert L. Brumit, Jr., Nashville, TN (US)

(73) Assignee: Google LLC, Mountain View, CA (US)

( * ) Notice: Subject to any disclaimer, the term of this patent is extended or adjusted under 35 U.S.C. 154(b) by 308 days.

(21) Appl. No.: 17/700,626

(22) Filed: Mar. 22, 2022

(65) Prior Publication Data
US 2023/0258900 A1 Aug. 17, 2023

Related U.S. Application Data

(60) Provisional application No. 63/310,216, filed on Feb. 15, 2022.

(51) Int. Cl.
G02B 6/00 (2006.01)
G02B 6/38 (2006.01)
G02B 6/44 (2006.01)
H04Q 1/02 (2006.01)

(52) U.S. Cl.
CPC ......... *G02B 6/4454* (2013.01); *G02B 6/3897* (2013.01); *G02B 6/4403* (2013.01); *H04Q 1/13* (2013.01)

(58) Field of Classification Search
CPC .. G02B 6/4454; G02B 6/3897; G02B 6/4403; G02B 6/00; H04Q 1/13
See application file for complete search history.

(56) References Cited

U.S. PATENT DOCUMENTS

| 4,964,685 | A  | 10/1990 | Savitsky et al. |
| 5,278,933 | A  | 1/1994  | Hunsinger et al. |
| 5,471,555 | A  | 11/1995 | Braga et al. |
| 6,424,782 | B1 | 7/2002  | Ray |
| 6,571,048 | B1 | 5/2003  | Bechamps et al. |
| 6,614,971 | B2 | 9/2003  | Sun et al. |
| 6,751,392 | B1 | 6/2004  | Szilagyi et al. |
| 7,228,047 | B1 | 6/2007  | Szilagyi et al. |
| 7,266,281 | B1 | 9/2007  | Flatau |

(Continued)

FOREIGN PATENT DOCUMENTS

| EP | 3910395 A1    | 11/2021 |
| WO | 2015116589 A1 | 8/2015  |

OTHER PUBLICATIONS

Extended European Search Report for European Patent Application No. 21171574.3 dated Oct. 18, 2021. 9 pages.

(Continued)

*Primary Examiner* — Jennifer Doan
(74) *Attorney, Agent, or Firm* — Lerner David LLP

(57) ABSTRACT

A patch panel assembly that has a splicing tray integrated therein for fiber optic hardware connection is provided. In one example, the patch panel assembly include a ceiling, a bottom cover, and two opposing side panels defining an interior region therein. A splicing tray disposed in the interior region of the patch panel assembly. The splicing tray is slidable between a non-extended position and an extended position.

18 Claims, 13 Drawing Sheets

(56) References Cited

U.S. PATENT DOCUMENTS

| | | |
|---|---|---|
| 7,345,241 B2 | 3/2008 | Caveney et al. |
| 7,418,183 B2 | 8/2008 | Wittmeier et al. |
| 7,546,018 B2 | 6/2009 | Hendrickson et al. |
| 7,620,288 B2 | 11/2009 | Smrha et al. |
| 7,711,236 B2 | 5/2010 | Gonzalez et al. |
| 8,364,000 B2 | 1/2013 | Gonzalez et al. |
| 8,457,461 B2 | 6/2013 | Ott |
| 10,514,518 B1 | 12/2019 | Livingston et al. |
| 10,558,007 B2 | 2/2020 | Brown et al. |
| 10,663,687 B1 | 5/2020 | McCloud et al. |
| 10,725,261 B2 | 7/2020 | Kobayashi et al. |
| 2005/0105873 A1 | 5/2005 | Reagan et al. |
| 2008/0298764 A1 | 12/2008 | Bloodworth et al. |
| 2009/0034929 A1* | 2/2009 | Reinhardt ............ G02B 6/4452 385/135 |
| 2010/0027955 A1 | 2/2010 | Parikh et al. |
| 2010/0125998 A1* | 5/2010 | Kowalczyk .......... G02B 6/4452 29/592.1 |
| 2018/0081139 A1* | 3/2018 | Geens ................. G02B 6/4477 |
| 2019/0056559 A1 | 2/2019 | Leeman et al. |
| 2021/0103112 A1 | 4/2021 | Claes et al. |

OTHER PUBLICATIONS

International Search Report and Written Opinion for International Application No. PCT/US2022/032768 dated Oct. 11, 2022. 14 pages.

International Preliminary Report on Patentability, Written Opinion Of The International Searching Authority, International Application No. PCT/US2022/032768 dated Aug. 20, 2024, 8 pages.

* cited by examiner

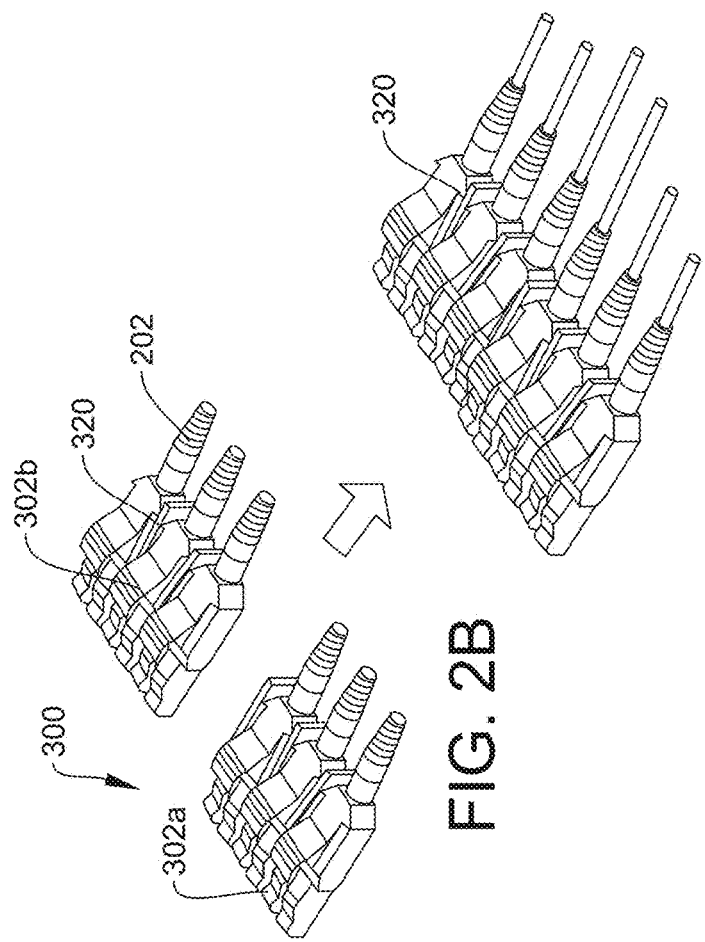
FIG. 2B
FIG. 2C
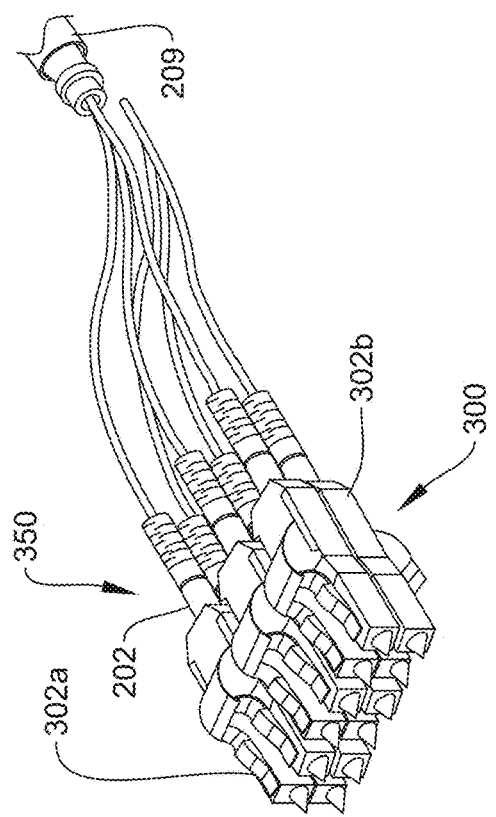
FIG. 2A

SPLICING TRAY UTILIZED IN FIBER OPTIC PATCH PANEL ASSEMBLY FOR FIBER OPTIC CABLE CONNECTION MANAGEMENT

CROSS-REFERENCE TO RELATED APPLICATIONS

The present application claims the benefit of the filing date of U.S. Provisional Patent Application No. 63/310,216 filed Feb. 15, 2022, the disclosure of which is hereby incorporated herein by reference.

BACKGROUND

The capabilities of fiber optic connectors, fiber optic cable and fiber optic hardware have been continuously advanced to meet the demands of increasing numbers of users and high transmission rate requirements. Fiber optic hardware is increasingly being used for a variety of applications, such as data transmission, video, broadband voice and the like. The fiber optic cable, connectors or electrical cables are connected to a fiber optic module mounted in a patch panel assembly disposed in a cable management rack located in a data distribution center or a server room.

Splice boxes are often utilized for fiber optic cable connection, management and storage. The splice boxes may provide a joint where one end of fiber optic cable from a first location is spliced to a corresponding fiber optic cable from a second location, such as from a server room to a data distribution center, or vice versa. However, splicing fiber optic cables is very labor intensive and time consuming. When the fiber optic cables are not properly coordinated or connected, additional time may be needed for the technicians or operators to locate, splice and reconnect the corresponding fiber optic cables, which may negatively impact the time and costs of installation. In some situations where the splice box is relatively large, storage of such splice boxes becomes problematic in high density server rooms or data centers.

BRIEF SUMMARY

A patch panel assembly with a splicing tray integrated therein is provided. The splicing tray may be integrated as a portion of the patch panel assembly and configured to be slidable between a non-extended position and an extended position for ease of cable connection and management. In one example, the patch panel assembly includes a ceiling, a bottom cover, and two opposing side panels defining an interior region therein. The splicing tray may be disposed in the interior region. The splicing tray is slidable between a non-extended position and an extended position.

In one example, one or more connector trays are vertically disposed above the splicing tray. The connector tray is configured to receive one or more connector structures. The connector structure includes a plurality of fiber optic connectors. Each of the fiber optic connectors has a corresponding connecting cable coupled thereto.

In one example, the connector structure includes a cable sorter having a first end connected to the connecting cable. A ribbon cable is connected to a second end of the cable sorter through a fiber cable clamp. In one example, the fiber optic connectors are dual polarity connectors.

In one example, the one or more connector trays and the splicing tray are individually slidable relative to each other. The splicing tray includes a splicing module formed in the splicing tray. The splicing module includes a plurality of holding features forming a spool configured to collect cables. The splicing module includes a plurality of splice holders formed in the spool configured to hold spliced cables.

In one example, the splicing module includes a plurality of sorters configured to form at least two circular routing passages in the splicing module. A plurality of grooves are formed in the splicing tray, the grooves configured to hold spliced cable looped from the circular routing passages. The one or more connector trays includes a plurality of slots formed in the connector trays configured to allow cables to pass therethrough to the splicing tray. A ribbon cable collector of a connector structure is configured to be placed on the splice holders formed in the splicing module. The one or more connector trays includes a plurality of slots formed in the connector trays configured to allow cables to pass therethrough to the splicing tray.

In one example, a front cover is disposed in the patch panel assembly and openable to allow the splicing tray slidable between the non-extended position and the extended position.

Another aspect of the disclosure provides a patch panel assembly including a ceiling, a bottom cover, and two opposing side panels defining an interior region therein. A splicing tray is disposed in the interior region. One or more connector trays are vertically stacked above the splicing tray. The connector tray and the splicing tray are individually slidable relative to each other.

In one example, the splicing tray further includes a splicing module disposed in the splicing tray. The splicing module is configured to store spliced cables.

In one example, the splicing module includes a plurality of grooves configured to hold spliced cable connected to the patch panel assembly. The connector tray is configured to receive one or more connector structures. The connector structure includes a plurality of fiber optic connectors. Each of the fiber optic connectors has a corresponding connecting cable coupled thereto.

Another aspect of the disclosure provides a patch panel assembly including a top ceiling, a bottom cover, and two opposing side panels defining an interior region therein. A splicing module is disposed in a splicing tray disposed in the interior region. The splicing tray is slidable between a non-extended position and an extended position and has grooves formed therein configured to hold spliced cable disposed in the interior region.

BRIEF DESCRIPTION OF THE DRAWINGS

FIGS. 2A-2C depict fiber optic connectors and inserts for holding fiber optic connectors according to aspects of the disclosure.

DETAILED DESCRIPTION

This disclosure provides a patch panel assembly that has a splicing tray integrated therein for fiber optic hardware connection. The splicing tray formed in the patch panel assembly may provide a storage space or a splicing area to facilitate cable storage, cable fusing or splicing so that a conventional stand-alone splicing structure/enclosure may be eliminated, thus reducing installation cost, labor, and splicing time.

Figure 1A:
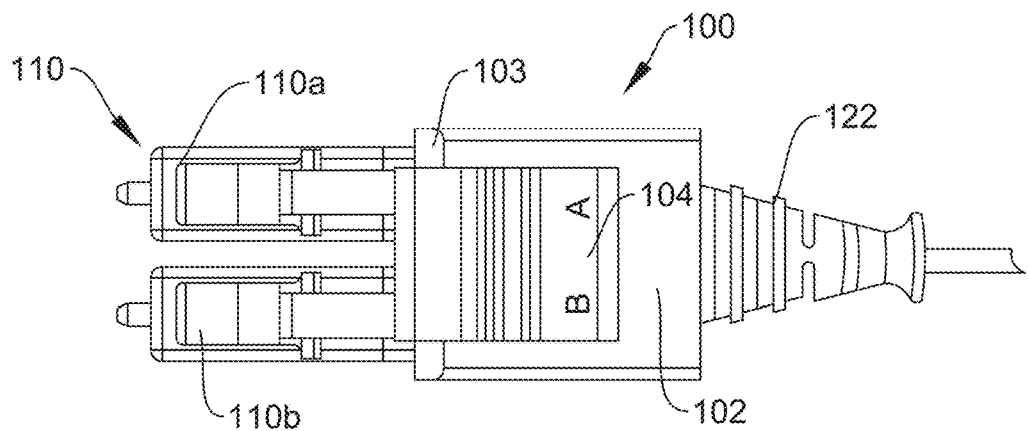
FIGS. 1A-1C depict top, front, and side views of an example fiber optic connector according to aspects of the disclosure.
Figure 1B:
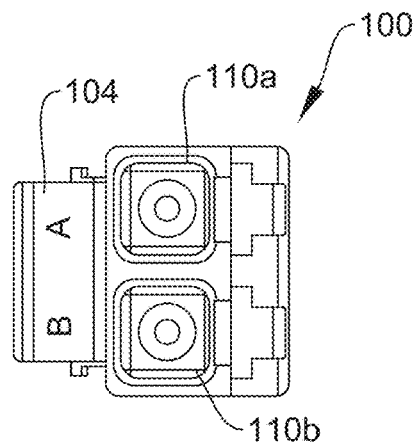
Figure 1C:
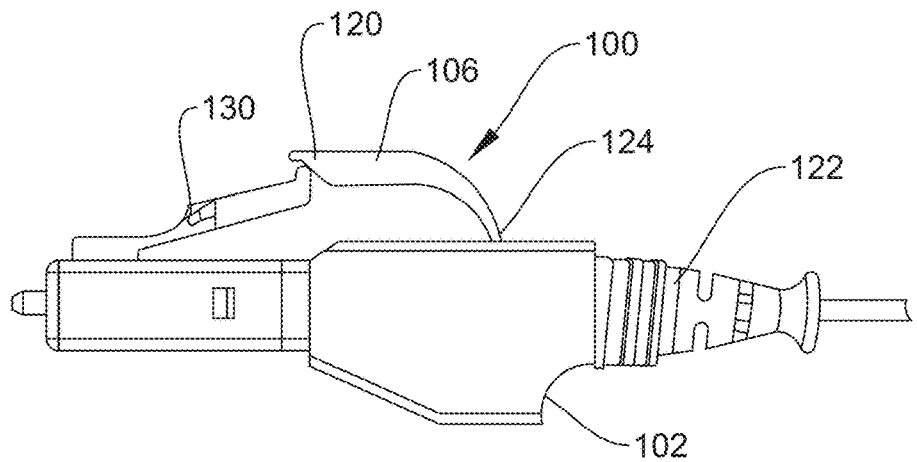

FIGS. 1A-1C depict an example of a fiber optic connector 100 that provides dual polarity configurations. FIG. 1A depicts a top view of the fiber optic connector 100. The fiber optic connector 100 comprises a body 102 that has two connector assemblies 110 (shown as 110a, 110b) connected thereto.

FIG. 1B depicts a front view of the fiber optic connector 100 illustrating the two connector assemblies 110 (shown as 110a, 110b) formed at a front section 103 of the fiber optic connector 100. Connector polarity indicia 104, shown as A and B, is formed in the body 102 that indicates the polarity of the connector 100. The body 102 encases two optic fibers connecting to the two connector assemblies 110a, 110b respectively. The two optic fibers enclosed in the body 102 are connected to a cable 122 connected to the body 102.

FIG. 1C depicts a side view of the fiber optic connector 100. A latch 106 has a first end 120 connected to the connector assemblies 110a, 110b through a spring latch arm 130 and a second end 124 connected to the body 102. The latch 106 is used to secure the fiber optic connector 100 to an adaptor. The spring latch arm 130 releasably engages the latch 106. The spring latch arm 130 may be pressed to disengage from the latch 106. When the spring latch arm 130 is released and disengaged from the latch 106, the connector assemblies 110a, 110b may be inserted into an adapter in a predetermined insertion direction. The adaptor may be disposed in a fiber optic module (as shown in FIG. 2) mounted in a fiber management system. The latch 106 abuts against the spring latch arm 130 connected to the connector assemblies 110a, 110b for manually pressing the latter to move downwardly to allow disengagement between the connector assemblies 110a, 110b and the adapter and removal of the connector assemblies 110a, 110b out of the port. When a reversal of the polarity configuration is desired, the spring latch arm 130 may be pressed to discharge the connector assemblies 110a, 110b from the body 102. The connector assemblies 110a, 110b may then be flipped and rotated for 180 degrees for polarity reversal and the latch 106 will then be re-attached to the opposite site of the body 102.

FIGS. 2A-2C depict a connector set 350 having a plurality of fiber optic connectors 300, similar to the connectors 100 of FIGS. 1A-1C, that may be placed and installed in a fiber optic module, which may be further disposed in a patch panel assembly. In the example depicted in FIG. 2A, six of the fiber optic connectors 300 are shown. It is noted that the number of the fiber optic connectors 300 may be varied as needed to accommodate different dimensions or sizes of the fiber optic module selected for use in the patch panel assembly. A first array 302a including three of the fiber optic connectors 300 are formed as an upper row, stacking on a second array 302b including another three of the fiber optic connectors 300 formed as a lower row. The first array 302a is vertically stacked up on the second array 302b. The vertical stacking-up configuration may provide a compact size of the connector set 350 to save space for transportation. A fiber optic connector inert 320, as shown in FIG. 3B, is utilized to hold and align the fiber optic connectors 300 in place, such as in a side by side configuration. The fiber optic connectors 300 may abut against each other through the fiber optic connector inert 320 positioned therebetween with the desired alignment. In the example depicted in FIG. 3B, the upper row of the first array 302a may be removed from the stacking, positioned apart from the lower row of the second array 302b. The first array 302a may be then placed in parallel and horizontally aligned with the second array 302b, such as a side by side configuration, to place the fiber optic connectors 300, as shown in FIG. 3C, in one array. The fiber optic connector inert 320 may assist holding the plurality of fiber optic connectors 300 in the desired position for installation.

Figure 3:
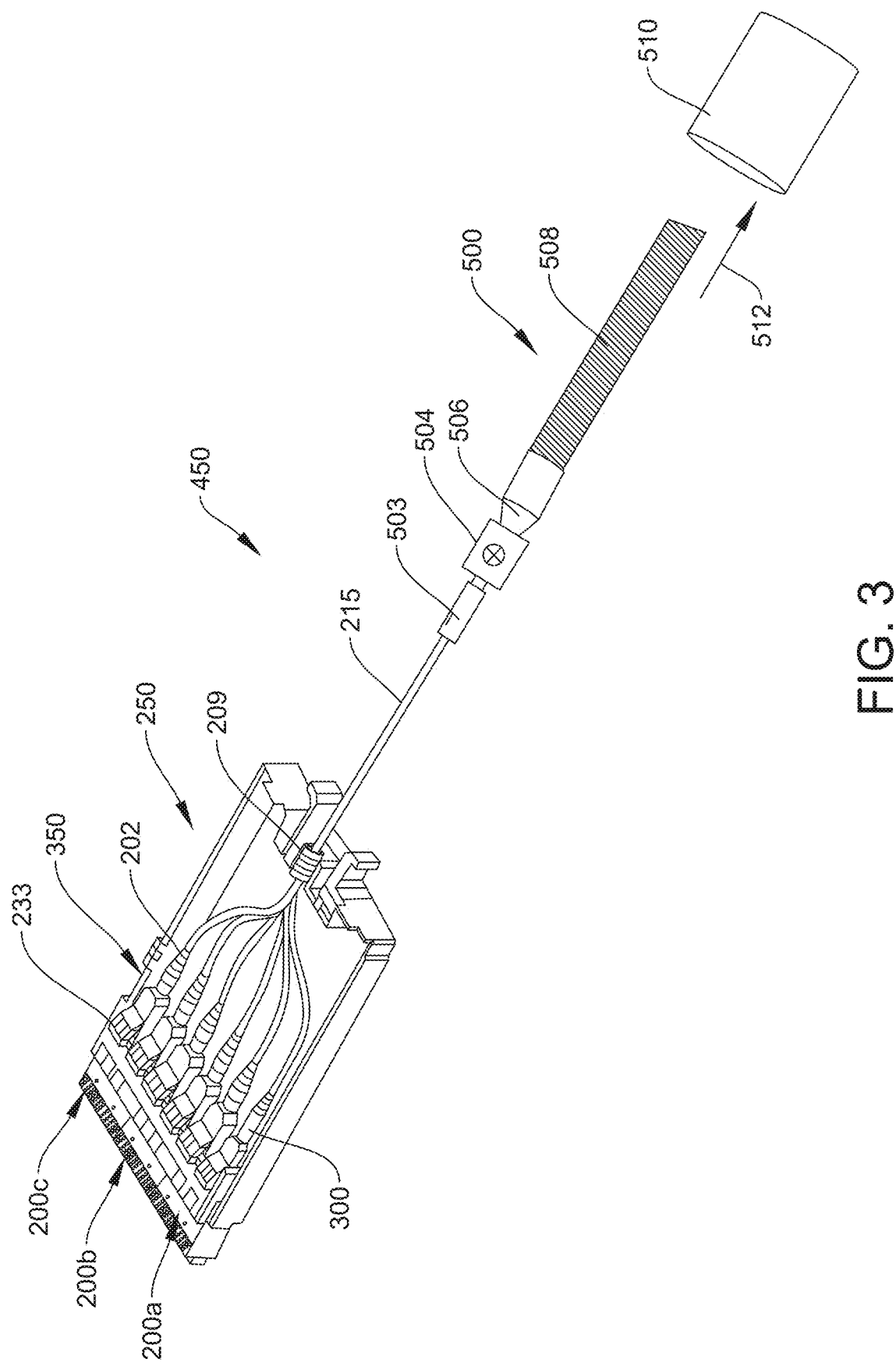
FIG. 3 depicts a portion of a cable connection structure having a ribbon cable in connection with a plurality of fiber optic connectors according to aspects of the disclosure.

FIG. 3 depicts a cable connection structure 500 having the plurality of fiber optic connectors 300 in connection with a cable connection structure 500 (partly shown) that may be further in connection with another set of fiber optic connectors (not shown). The cable connection structure 500 has a first end including an optic fiber ribbon cable 215 connected through a fiber cable clamp 504. Each fiber optic connector 300 has a corresponding cable 202 that may be collected in the optic fiber ribbon cable 215 through a cable collecting connector 209. The ribbon cable 215 that may be collected and gathered by the fiber cable clamp 504. The fiber optic connectors 300 may be placed in a fiber optic module 250. One or more adaptor modules 200a, 200b, 200c may be mounted therein to receive the fiber optic connectors 300 to be placed therein. The connecting cable 202 may be coupled from a rear end 233 of the adaptor module 200a, 200b, 200c. A ribbon cable collector 503 may be utilized to facilitate collection of the ribbon cable 215 to be in connection with the fiber cable clamp 504. The fiber cable clamp 504 may further connect the ribbon cable 215 to a plurality of connecting cables 508 through a cable sorter 506. In one example, the fiber cable clamp 504 is removable from the ribbon cable collector 503 as needed. The plurality of connecting cables 508 may further be in connection with another set of fiber optic connectors. The fiber cable clamp 504 may facilitate connection or separation of the ribbon cable 215 to the plurality of connecting cables 508, or vice versa. The length of the ribbon cable 215 may be adjusted, altered, or varied based on the different connection requirements among different fiber optic modules 250 located at different patch panel assemblies. A connection tube 510 may be utilized to enclose the plurality of connecting cables 508 therein for protection during transportation or installation.

Figure 4A:
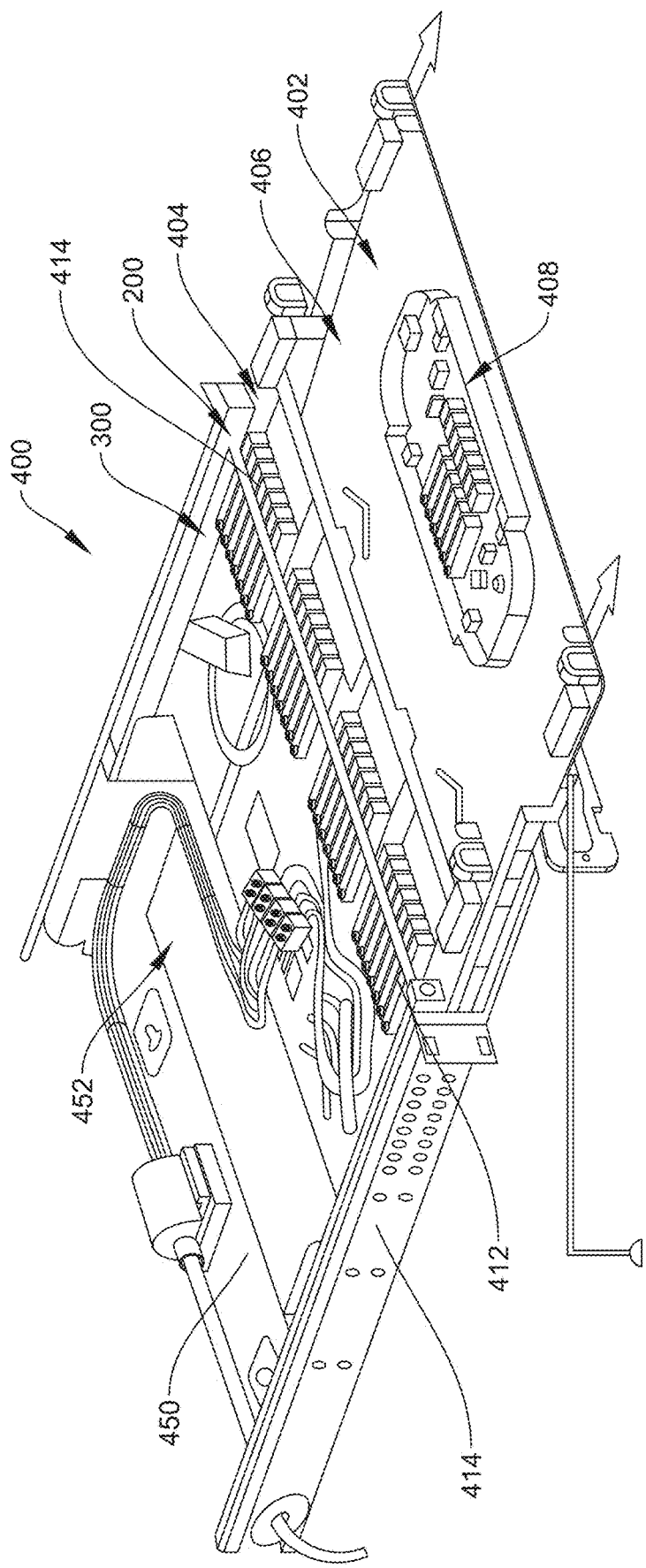
FIG. 4A depicts a patch panel assembly having a splicing tray integrated therein according to aspects of the disclosure.

FIG. 4A depicts a perspective view of a patch panel assembly 400 having a splicing tray 402 formed therein. The patch panel assembly 400 has a ceiling cover (not shown), at least two opposing side panels 414 and a bottom cover 450, defining an interior region 452 for fiber optic connector connection. In the example depicted in FIG. 4A, the ceiling cover is not present and not coupled to the patch panel assembly 400 for ease of viewing and illustration. The patch panel assembly 400 may include a first tray 404, such as an upper tray or a connector tray, and a second tray 402, such as a lower tray. In one example, the second tray 402 is configured to be a splicing tray 402 that includes a splicing module 408 disposed therein. The splicing module 408 may facilitate storing or organizing spliced or non-spliced cables. In some examples, the splicing module 408 may provide an area for cable splicing. Both the first and the second trays 404, 402 are individually slidable to be pulled out from a non-extended position to an extended position. In one example, a plurality of adaptor modules 200 may be disposed on the first tray 404, configured to receive a plurality of corresponding fiber optic connectors 300. In the example depicted in FIG. 4A, four adaptor modules 200 are presented. It is noted that the numbers of the adaptor modules unutilized in the patch panel assembly 400 may be varied by different number requirements of the fiber optic connectors 300 to be connected to the patch panel assembly 400. The adaptor modules 200 assist holding the fiber optic connectors 300 in a desired position configured in the patch panel assembly 400.

In one example, a mounting rail 412 is disposed on the first tray 404 defining multiple slots 414 to receive respective adaptor modules 200 therein. Each adaptor module 200 may include one or more adaptor ports configured to receive a respective fiber optic connector 300. The first tray 404 is slidable relative to the side panels 414 of the patch panel assembly 400. The first tray 404 carries the fiber optic connectors 300 that may be slidable between an extended position and a non-extended position for ease of cable management by an operator. The second tray 406 is configured to be a splicing tray 402 that has the splicing module 408 formed therein to facilitate organizing, splicing and storing cables.

Figure 4B:
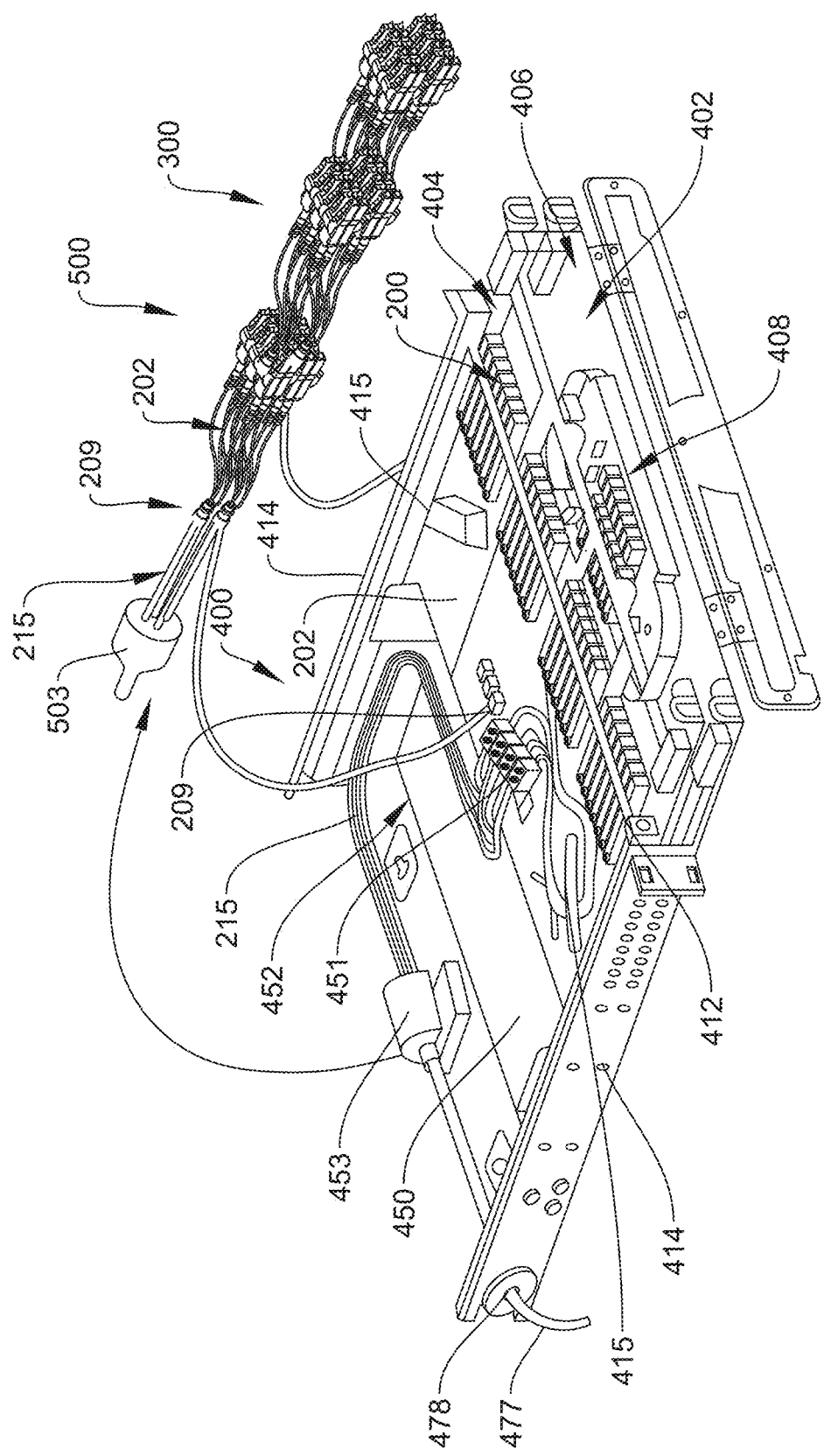
FIG. 4B depicts an exploded view of fiber optic connectors being placed in the patch panel assembly of FIG. 4A according to aspects of the disclosure.

FIG. 4B depicts a perspective view of the patch panel assembly 400 having the splicing tray 402 formed therein. In the example depicted in FIG. 4B, the splicing tray 402 is in a non-extended position. An exploded view of the fiber optic connector 300 is provided prior to being positioned into the patch panel assembly 400. The patch panel assembly 400 includes several features configured to hold the fiber optic connector 300 and the associated cables in the designated positions. For example, the fiber optic connector 300 are configured to be placed in the adaptor modules 200. The cable 202 coupled to each of the fiber optic connector 300 are sorted by the sorters 415 and collected by a plurality of holders 451 through the cable collecting connector 209. The ribbon cable 215 is then further routed through and secured by a ribbon cable securing feature 453. An outgoing or incoming cable 477 may be coupled to the ribbon cable 215 through the ribbon cable securing feature 453. A slot 478 may be formed in the side panel 414 to facilitate the outgoing or incoming cable 477 to be passed therethrough.

Figure 5:
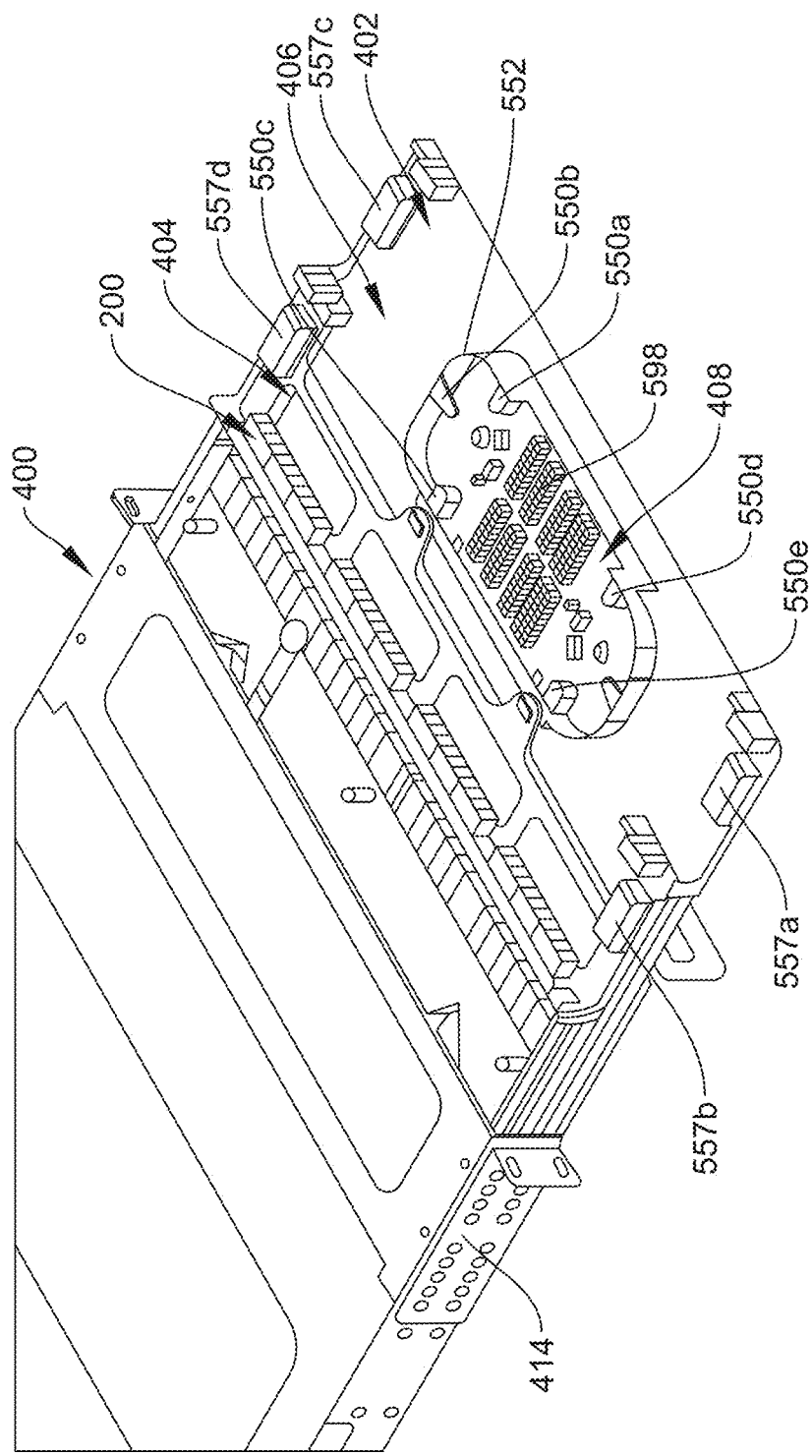
FIG. 5 depicts the patch panel assembly of FIG. 4A having the splicing tray in an extended position according to aspects of the disclosure.

FIG. 5 depicts a front top view of the patch panel assembly 400 with the splicing tray 402 in the extended position. The splicing module 408 formed in the splicing tray 402 comprises a spool 552 including a plurality of holding features 550a-550d configured to confine or define routing passages for the cables stored therein. A plurality of splice holders 598 are formed in, or in close proximity to, the spool 552 configured to hold the spliced cables in a desired position. The cables may be looped around the spool 552. The splice holders 598 may hold the spliced cables or fused cables around the spool 552 through the holding features 550a-550d to prevent cable damage and/or facilitate proper cable management. The density of the splicing holders 598 formed in the splicing module 408 may be varied based on the length and amount of the cables to be stored in the splicing module 408. In one example, the splicing holders 598 may be formed in arrays that allows the cables to be secured thereto in a horizonal configuration. A plurality of cable sorters 557a-557d may be formed in a periphery region of the splicing tray 402 to facilitate managing the locations where the incoming cables and the outgoing cables may be located.

Figure 6:
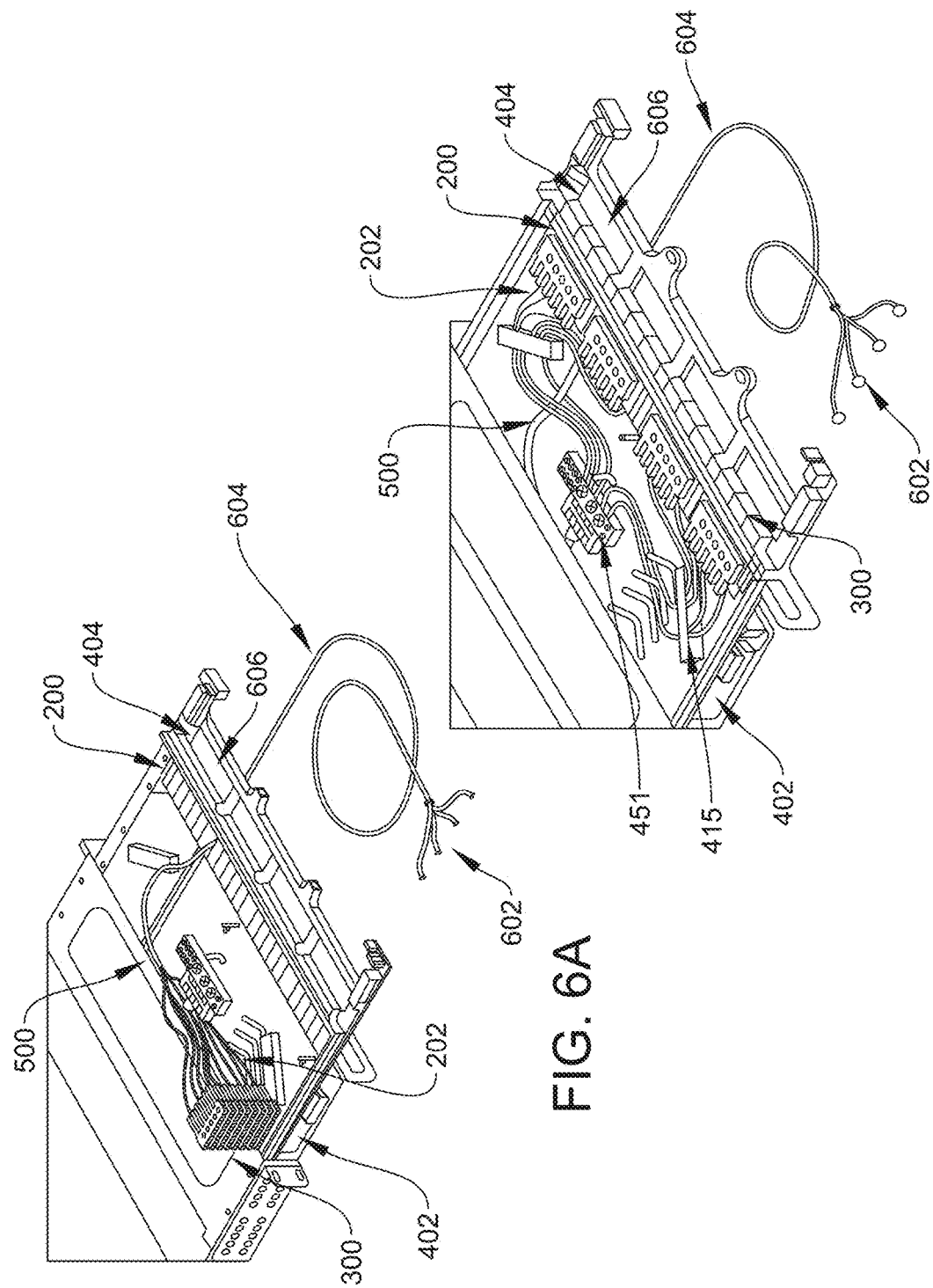
FIGS. 6A-6B depict an upper tray of the patch panel assembly of FIG. 4A according to aspects of the disclosure.

FIGS. 6A-6B depict one example of how the connector structure 500 may be routed in the first tray 404. A plurality of slots 606 may be formed in the first tray 404 to facilitate the cable ribbon 604 to move downwards to the splicing tray 402 for storage. The cable ribbon 604 may be spliced, forming termination points 602, such as spliced cable ends, to be placed in the splicing module 408 disposed in the splicing tray 402 below the first tray 404. In the example depicted in FIG. 6A, the connector structure 500 is not yet installed and placed in the adaptor modules 200 disposed in the first tray 404. In the example depicted in FIG. 6B, the connector structure 500 is installed and placed in the first tray 404 with the fiber optic connectors 300 connected in the adaptor modules 200 while the corresponding cables 202 placed and sorted by the sorters 415 defined in the first tray 404. The cables 202 may be held by the holders 451 to secure the cable ribbon 604 in a desired position so as to route the cable ribbon 604 through the slots 606 to the underlying splicing tray 402 to store the excessive or spliced ribbon cables.

Figure 7:
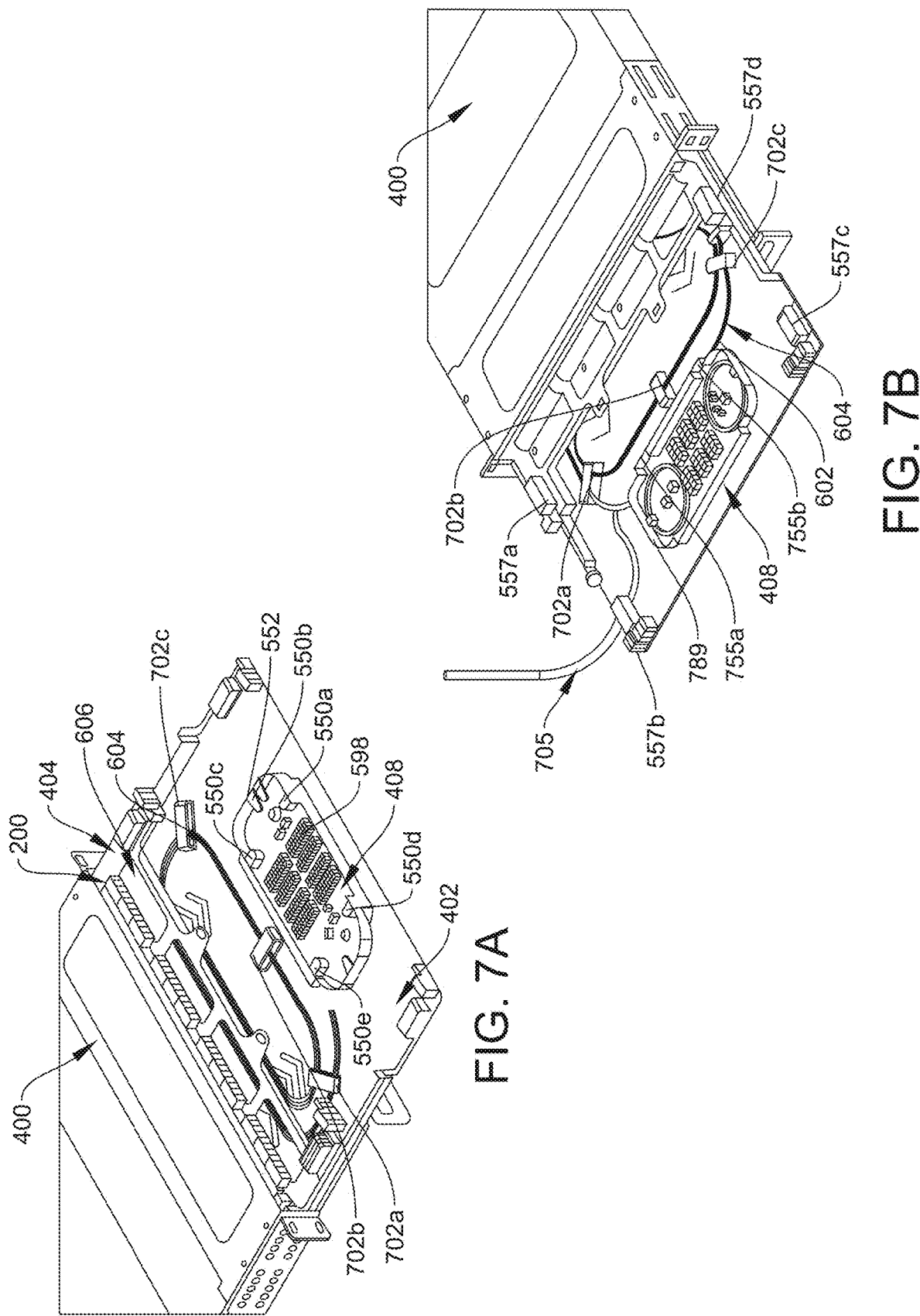
FIGS. 7A-7B depict the splicing tray of the patch panel assembly of FIG. 4A according to aspects of the disclosure.

FIGS. 7A-7B depict one example of how the cable ribbon 604 and the incoming or outgoing cable 705 may be routed in the splicing tray 402 for connection. As depicted in FIG. 7A, the cable ribbon 604 may be routed and secured by the routing sorts 702a-702c defined in the splicing tray 402. The cable ribbon 604 is secured by the routing sorts 702a-702c for splicing in the splicing module 408 when needed. After splicing, the termination points may be held by the splice holders 598 and stored in the splicing module 408. When an incoming cable 705 is configured to be in connection with the cable ribbon 604, the incoming cable 705 may pass through the plurality of cable sorters 557a-557d to be routed through the routing sorts 702a-702c in the splicing tray 402, as depicted in FIG. 7B. The incoming cable 705 may have a terminal end 789 coupled to a groove 755a formed in the splicing module 408 while the cable ribbon 604 may have its termination points 602, such as spliced cable ends, coupled to another groove 755b formed in the splicing module 408 to facilitate connection between the incoming cable 705 and the cable ribbon 604.

Figure 8:
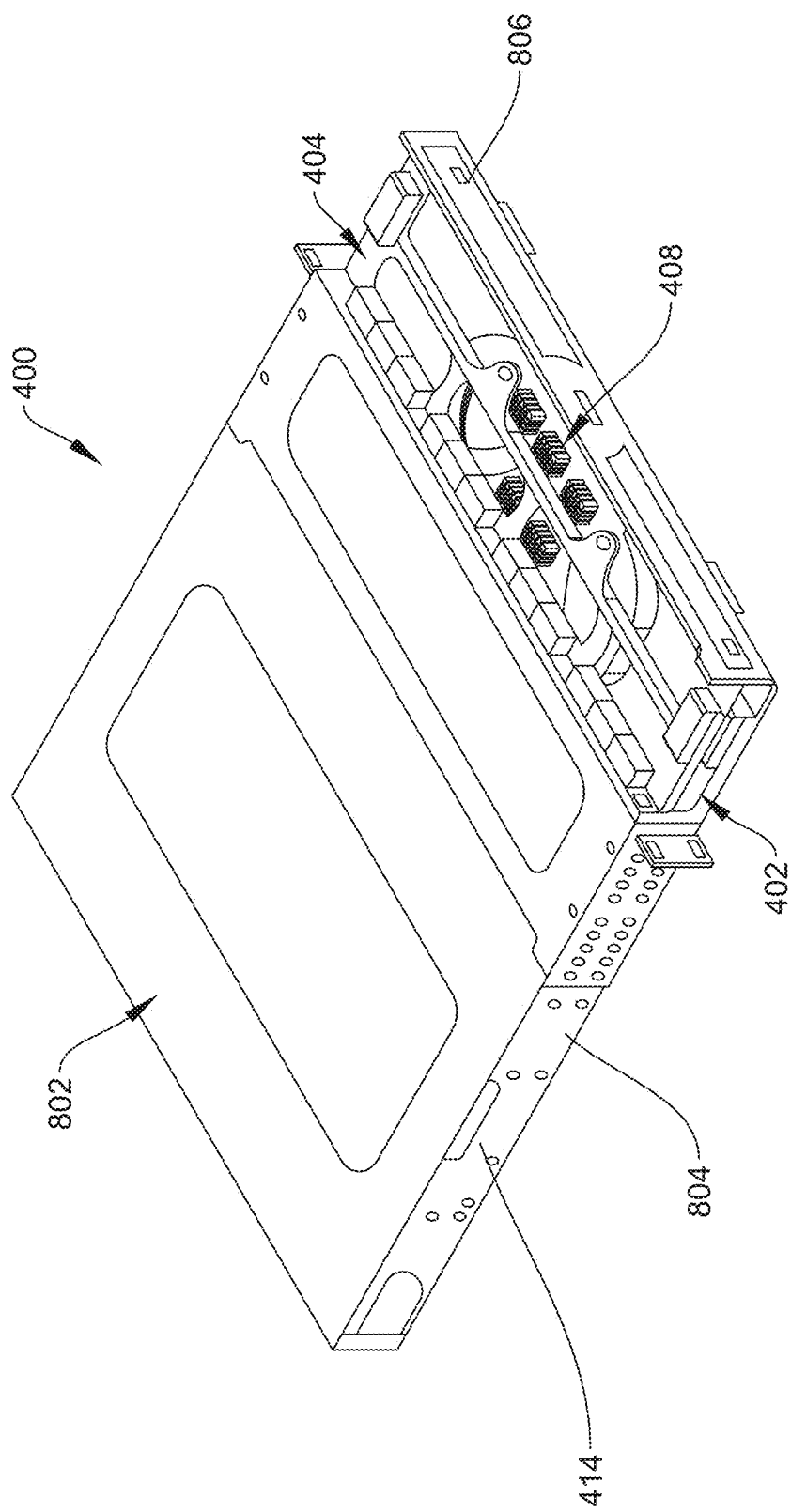
FIG. 8 depicts the patch panel assembly of FIG. 4A in a non-extended position according to aspects of the disclosure.

FIG. 8 depicts one example of the patch panel assembly 400 that has both the first tray 404 and the lower splicing tray 402 in a vertically stacked and aligned position. A front cover 806 may be utilized to secure the both the first tray 404 and the lower splicing tray 402 in the non-extended position. The patch panel assembly 400 includes a top ceiling 802, at least two or more opposing side panels 414 and a bottom cover 804 defining an interior region to receive the first tray 404 and the splicing tray 402 stored therein. Both the first tray 404 and the splicing tray 402 are individually slidable relative to each other and the side panel 414 of the patch panel assembly 400. By utilizing the slidable feature, the first tray 404 and the splicing tray 402 may be individually pulled out for ease of cable management. As such, the cable connection and cable splicing may be relatively easy to manage for the operators performing the task.

Figure 9:
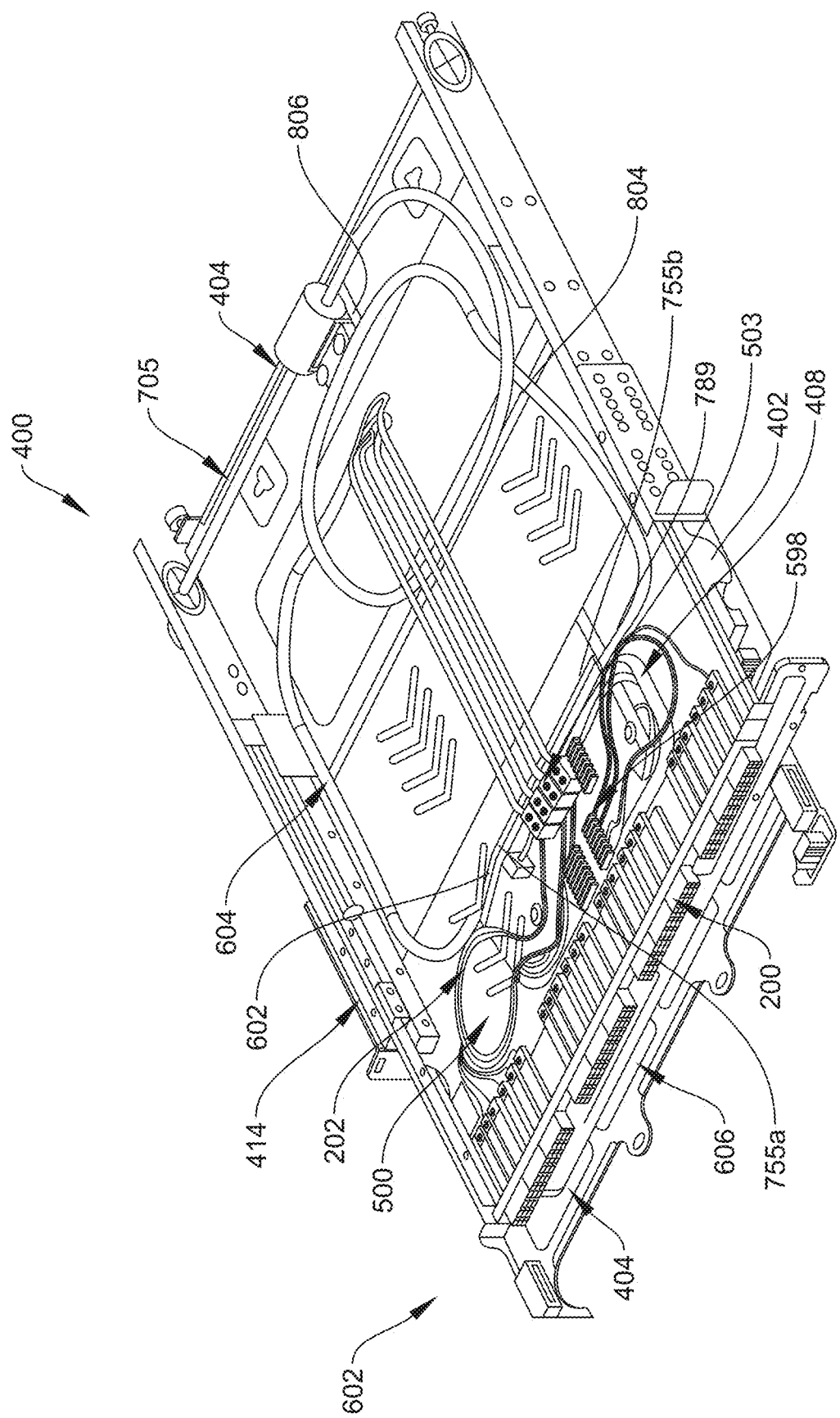
FIG. 9 depicts a top view of the patch panel assembly of FIG. 4A according to aspects of the disclosure.

FIG. 9 depicts a top view of the patch panel assembly 400 of FIG. 8 with the top ceiling 802 removed for ease of viewing and illustration. The connection structure 500 may be positioned in the first tray 404 where the adaptor modules 200 are placed. The cables 202 from the connection structure 500 may be coupled to the splicing module 408 by placing the ribbon cable collector 503 on the splice holders 598 formed in the splicing module 408. The incoming cable 705 has a terminal end 789 coupled to the groove 755b formed in the splicing module 408 while the cable ribbon 604 may have its termination points 602, such as spliced cable ends, coupled to another groove 755a formed in the splicing module 408 to facilitate connection between the incoming cable 705 and the cable ribbon 604. The spliced or fused cable may be stored in the splicing module 408.

Figure 10B:
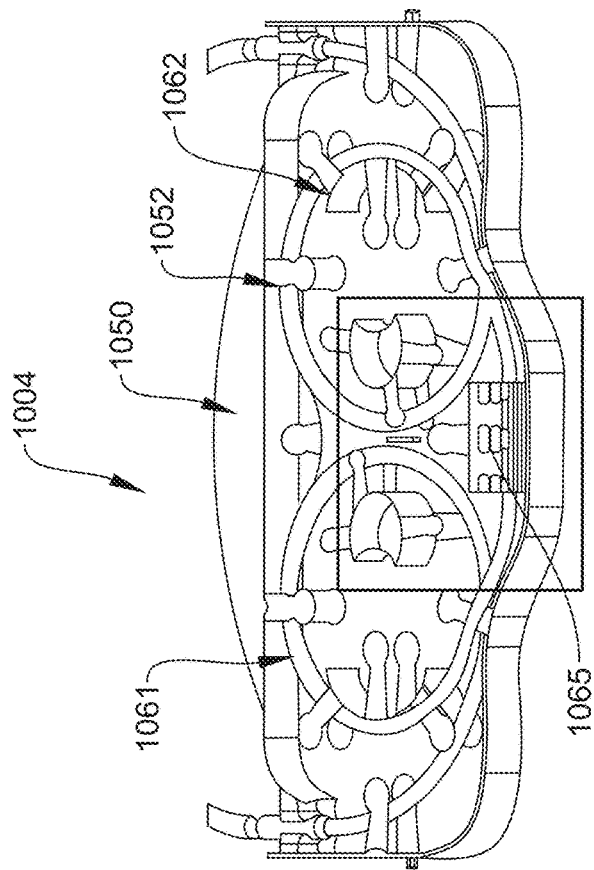
FIGS. 10A-10B depict a high-density patch panel assembly with a splicing tray according to aspects of the disclosure.
Figure 10A:
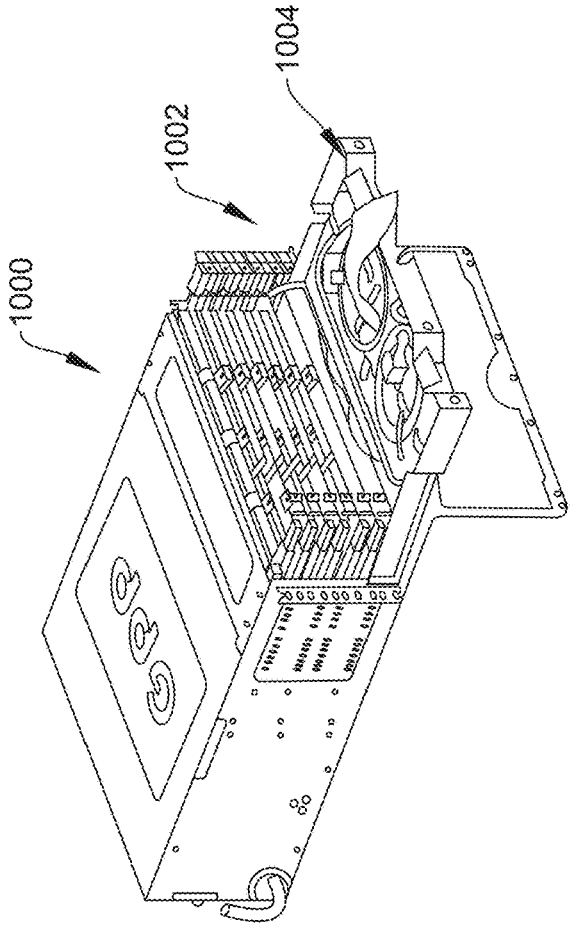

FIG. 10A-10B depicts one example of a high-density patch panel assembly 1000. The high-density patch panel assembly 1000 includes multiple trays 1002, such as connector trays similar to the first tray 404 described above, disposed above a splicing tray 1004. In the example depicted in FIG. 10A, the multiple trays 1002 are vertically stacked and are configured to receive multiple connection structures, such as the connection structures 500 described above. Each of the multiple trays 1002 may receive adaptor modules configured to receive multiple fiber optic connectors 100. Each of the multiple trays 1002 is also individually slidable and may be pulled out for ease of cable management and arrangement. The splicing tray 1004, similar to the splicing tray 402 described above, may also be slidable to facilitate splicing, fusing and storing cables. FIG. 10B depicts a top view of the splicing tray 1004 having the splicing module 1050 formed therein. The splicing module 1050 may have multiple sorters 1052 configured to form at least two circular routing passages 1061, 1062 to confine the routing paths of the cables. A plurality of groves 1065 may be formed in the splicing tray 1050 configured to hold the spliced cable or fused cable. The numbers of the grooves 1065 formed in the splicing tray 1004 may be varied for different requirements and configurations.

Figure 11:
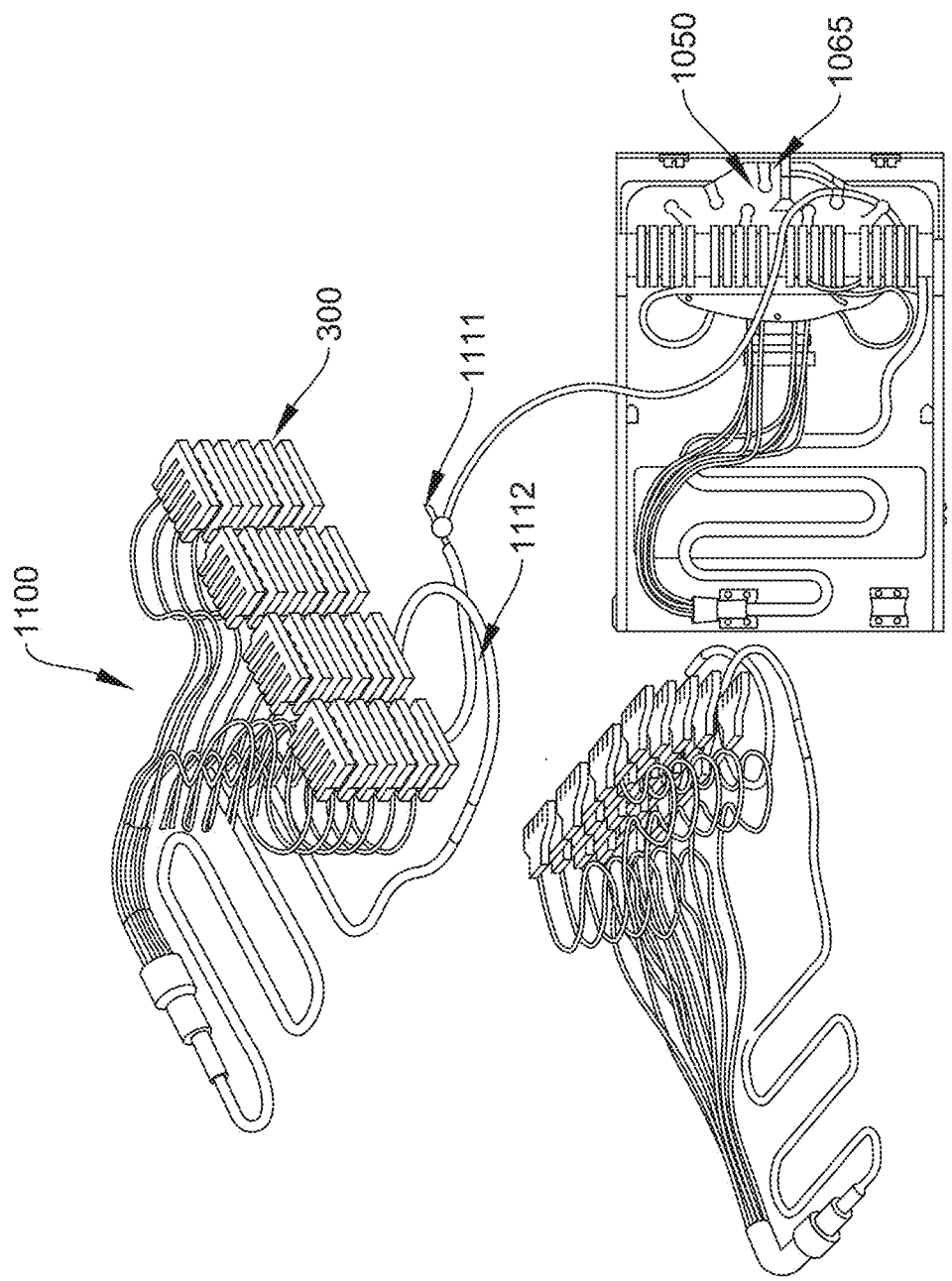
FIG. 11 depicts a high-density patch panel assembly according to aspects of the disclosure.

FIG. 11 depicts another example of a connection structure 1100. The configuration of the connection structure 1100 is similar to the connection structure 500 described above, except that the fiber optic connectors 300 are pre-arranged and stacked vertically to form multiple horizonal arrays. The number of the horizonal arrays formed in the connection structure 1100 may correspond to the numbers of the connector trays, such as the multiple trays 1002, configured in the high-density patch panel assembly 1000 of FIG. 10. Each horizonal array of the fiber optic connectors 300 is placeable into the corresponding connector tray 1002 configured in the high-density patch panel assembly 1000. As depicted in FIG. 11, a terminal end 1111, such as a spliced or fused end, of the cable 1112 may be held in the grooves 1065 formed in the splicing module 1050.

Figure 12:
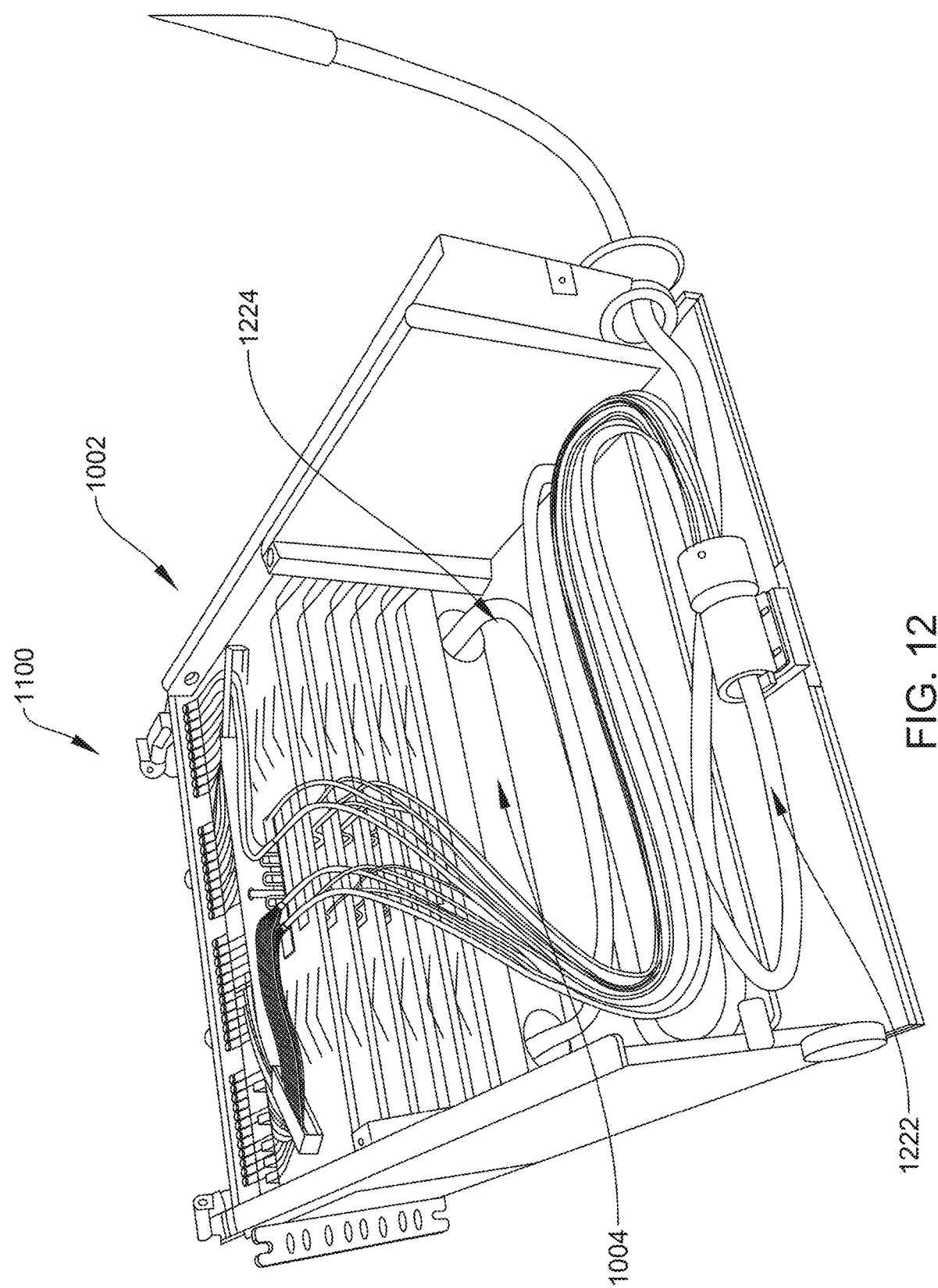
FIG. 12 depicts a rear view of a high-density patch panel assembly according to aspects of the disclosure.

FIG. 12 depicts a rear view of the high-density patch panel assembly 1100 according to aspects of the disclosure. The multiple connector tray 1002 is vertically stacked above the splicing tray 1004. The excess cable ribbon 1222 and the incoming cable 1224 may both be connected to the splicing module 1050 in the splicing tray 1004 for cable management, splicing and connection.

Thus, a patch panel assembly that has a splicing tray integrated therein for fiber optic hardware connection is provided. The splicing tray formed in the patch panel assembly may provide a storage space or a splicing area to facilitate cable storge, cable fusing or splicing so that a conventional stand-alone splicing structure/enclosure may be eliminated, thus reducing installation cost, labor, and splicing time. Furthermore, the splicing tray may be slidable relative to other trays in the patch panel assembly so as to facilitate performing cable management and arrangement tasks by the operators.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A patch panel assembly, comprising:
   a top ceiling, a bottom cover, and two opposing side panels defining an interior region therein;
   a splicing tray disposed in the interior region, wherein the splicing tray is slidable between a non-extended position and an extended position;
   one or more connector trays vertically disposed above and coupled with the splicing tray, the one or more connector trays slidable with the splicing tray between the non-extended position and the extended position; and
   a front cover openable to allow the splicing tray and the one or more connector trays to move together between the non-extended position and the extended position.

2. The patch panel assembly of claim 1, wherein the connector tray is configured to receive one or more connector structures including a plurality of fiber optic connectors, wherein each of the fiber optic connectors has a corresponding connecting cable coupled thereto.

3. The patch panel assembly of claim 2, wherein each of the one or more connector structures comprises:
   a cable sorter having a first end connected to the connecting cable; and
   a ribbon cable connected to a second end of the cable sorter through a fiber cable clamp.

4. The patch panel assembly of claim 2, wherein the fiber optic connectors are dual polarity connectors.

5. The patch panel assembly of claim 2, wherein a ribbon cable collector of a connector structure is configured to be placed on the splice holders formed in the splicing module.

6. The patch panel assembly of claim 1, wherein the one or more connector trays comprise:
   a plurality of slots formed in the connector trays configured to allow cables to pass therethrough to the splicing tray.

7. The patch panel assembly of claim 1, wherein the one or more connector trays comprise:
   a plurality of slots formed in the connector trays configured to allow cables to pass therethrough to the splicing tray.

8. The patch panel assembly of claim 1, wherein the one or more connector trays and the splicing tray are individually slidable relative to each other.

9. The patch panel assembly of claim 1, wherein the splicing tray comprises:
a splicing module formed in the splicing tray.

10. The patch panel assembly of claim 9, wherein the splicing module comprises:
a plurality of holding features forming a spool configured to collect cables.

11. The patch panel assembly of claim 10, wherein the splicing module comprises:
a plurality of splice holders formed in the spool configured to hold spliced cables.

12. The patch panel assembly of claim 9, wherein the splicing module comprises:
a plurality of sorters configured to form at least two circular routing passages in the splicing module.

13. The patch panel assembly of claim 12, wherein the splicing module comprises:
a plurality of grooves formed in the splicing tray configured to hold spliced cables looped from the circular routing passages.

14. A patch panel assembly, comprising:
a ceiling, a bottom cover, and two opposing side panels defining an interior region therein;
a splicing tray disposed in the interior region; and
one or more connector tray vertically stacked above and coupled with the splicing tray, the one or more connector trays slidable with the splicing tray between the non-extended position and the extended position; and
a front cover openable to allow the splicing tray and the one or more connector trays to move between the non-extended position and the extended position, wherein the connector tray and the splicing tray are individually slidable relative to each other.

15. The patch panel assembly of claim 14, wherein the splicing tray comprises:
a splicing module disposed in the splicing tray, wherein the splicing module is configured to store spliced cables.

16. The patch panel assembly of claim 15, wherein the splicing module comprises:
a plurality of grooves configured to hold spliced cable connected to the patch panel assembly.

17. The patch panel assembly of claim 14, wherein the connector tray is configured to receive one or more connector structure, wherein the connector structure includes a plurality of fiber optic connectors, wherein each of the fiber optic connectors has a corresponding connecting cable coupled thereto.

18. A patch panel assembly, comprising:
a top ceiling, a bottom cover, and two opposing side panels defining an interior region therein;
a splicing module disposed in a splicing tray disposed in the interior region, wherein the splicing tray is slidable between a non-extended position and an extended position and has grooves formed therein configured to hold spliced cable disposed in the interior region;
one or more connector tray vertically stacked above and coupled with the splicing tray, the one or more connector trays slidable with the splicing tray between the non-extended position and the extended position; and
a front cover openable to allow the splicing tray and the one or more connector trays to move together between the non-extended position and the extended position.

* * * * *